(12) United States Patent
Golitz et al.

(10) Patent No.: US 12,372,387 B2
(45) Date of Patent: Jul. 29, 2025

(54) FLOW VELOCITY MEASUREMENT ARRANGEMENT

(71) Applicant: HACH LANGE GMBH, Berlin (DE)

(72) Inventors: Andreas Golitz, Berlin (DE); Manfred Battefeld, Berlin (DE); Axel Leyer, Berlin (DE); Sebastian Goertz, Berlin (DE); Michael Kussmann, Berlin (DE); Frank Steinhauer, Berlin (DE); Kathrin Otte, Berlin (DE); Hartmut Dräger, Berlin (DE)

(73) Assignee: HACH LANGE GMBH, Berlin (DE)

( * ) Notice: Subject to any disclaimer, the term of this patent is extended or adjusted under 35 U.S.C. 154(b) by 341 days.

(21) Appl. No.: 18/016,887

(22) PCT Filed: Jul. 14, 2021

(86) PCT No.: PCT/EP2021/069557
§ 371 (c)(1),
(2) Date: Jan. 19, 2023

(87) PCT Pub. No.: WO2022/017877
PCT Pub. Date: Jan. 27, 2022

(65) Prior Publication Data
US 2023/0304842 A1 Sep. 28, 2023

(30) Foreign Application Priority Data
Jul. 21, 2020 (DE) .................... 20 2020 104 201.7

(51) Int. Cl.
*G01F 1/708* (2022.01)
*G01F 1/64* (2006.01)
*G01N 27/10* (2006.01)

(52) U.S. Cl.
CPC ................ *G01F 1/708* (2013.01); *G01F 1/64* (2013.01); *G01N 27/10* (2013.01)

(58) Field of Classification Search
CPC .......... G01F 1/708; G01F 1/712; G01F 1/704; G01F 1/64; G01F 27/10
See application file for complete search history.

(56) References Cited

U.S. PATENT DOCUMENTS

| 4,559,831 A | 12/1985 | Prestele |
| 2005/0045621 A1 | 3/2005 | Chenier et al. |
| 2021/0069708 A1* | 3/2021 | Govyadinov ........... G01F 1/708 |

OTHER PUBLICATIONS

European Patent Office, International Search Report and Written Opinion, Oct. 22, 2021, 9 pages.

* cited by examiner

*Primary Examiner* — Paul M. West
(74) *Attorney, Agent, or Firm* — Ference & Associates LLC

(57) ABSTRACT

A flow velocity measurement arrangement (10) for determining the flow velocity of an electrically conductive liquid in a liquid line, comprising an air bubble injector (82) for injecting an air bubble into a liquid flow, a first electrical conductivity measurement cell (30) downstream of the air bubble injector (82) and upstream of a measurement line (40), a second electrical conductivity measurement cell (30') downstream of the measurement line (40), an evaluation unit (20) which determines the flow velocity of the liquid in the measurement line (40) on the basis of the time-related characteristics of the conductivity measurement results of the two measurement cells (30, 30').

17 Claims, 2 Drawing Sheets

FLOW VELOCITY MEASUREMENT ARRANGEMENT

Figure 1:
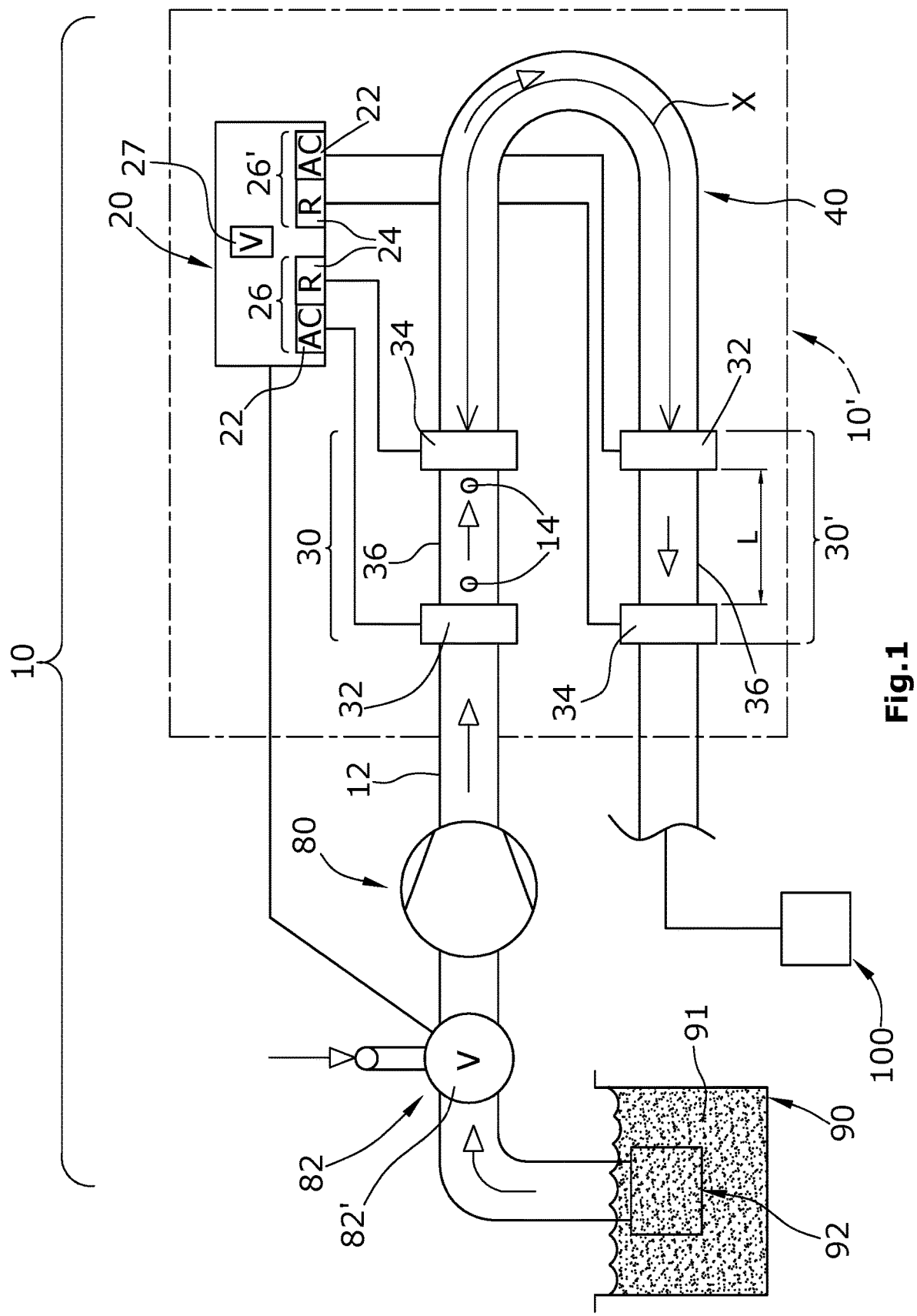

The present application is a National Phase Entry of PCT International Application No. PCT/EP2021/069557, which was filed on Jul. 14, 2021, and which claims priority to German Application No. 20 2020 104 201.7, filed on Jul. 21, 2020, the contents of which are hereby incorporated by reference.

The present invention relates to a flow velocity measurement arrangement for determining the flow velocity of an electrically conductive liquid in a liquid conduit.

The present invention in particular relates to a flow velocity measurement arrangement for a process analyser for water in a process basin of a sewage treatment plant, wherein the flow velocity measurement arrangement is in particular arranged in a delivery line between a sampling element, which is immersed in the water in a process basin of the sewage treatment plant, and the land-based analyser. A water sample is pumped from the water of the process basin by a sample pump from the sampling element to the land-based analysis unit. A peristaltic pump is generally used as the sample pump, the fluidic part of which is a flexible hose that can easily be replaced if necessary. Since the fluidic part of the sample pump is elastically and plastically deformed, the flow rate of the sample pump cannot be used to conclude the amount of water pumped. A flow rate measurement between the sampling element and the analysis unit is therefore necessary, for example, to be able to provide that a fresh water sample is always analysed in the analysis unit and to be able to detect an existing or an upcoming blockage.

A layer of dirt constantly grows on the inside of the conveying pipe when conveying more or less untreated wastewater. This makes it difficult for many physical measuring methods to reliably determine the flow velocity of the water in the delivery line. A transit time measurement with air bubble injection has shown good results for such applications, whereby the air bubbles are detected optically or photometrically. The useful signal here also deteriorates considerably as the dirt layer increases.

An object of the present invention is to provide a more dirt layer-tolerant flow velocity measurement arrangement.

This object is solved by the present invention with a flow velocity measurement arrangement having the features of claim 1.

The flow velocity measurement arrangement according to the present invention determines the presence of one or more injected air bubbles not optically, but conductively. It is thereby a prerequisite that the liquid is electrically conductive, which is the case with water or waste water in a waste water treatment plant. The measurement arrangement has an air bubble injector for injecting one or more air bubbles into a water sample liquid stream. Two separate electrical conductivity measurement cells are arranged downstream of the air bubble injector, between which a fluidic measurement line is arranged having a defined and known length. The first electrical conductivity measurement cell is thus arranged downstream of the air bubble injector and upstream of the measurement line, whereas the second electrical conductivity measurement cell is arranged downstream of the measurement line. The two measurement cells border the measurement line. The measured conductivity is significantly reduced when an air bubble passes the measurement cell as long as the air bubble is between the two electrodes of the measurement cell. This generates a time-related conductivity profile.

The conductivity measurement cell can be designed in different ways, but preferably measures the electrical conductivity in the fluid flow direction, i.e., in the longitudinal direction, not in the transverse direction.

The measurement arrangement also comprises an evaluation unit that determines the flow velocity of the fluid in the measurement line based on the temporal curve of the conductivity measurement results of the two measurement cells. The evaluation unit is informationally connected to the two measurement cells via a signal connection for this purpose. After the air bubble injection, the evaluation unit records, for example, the time-related conductivity profile in the first conductivity measurement cell and, in the second conductivity measurement cell, compares these profiles with each other, and determines the transit time between the two conductivity measurement cells if the two patterns match sufficiently. Since the fluidic length of the stiff and volume-stable measurement line between the two conductivity measurement cells is known, the evaluation unit finally calculates from this the flow velocity in the measurement line or the flow quantity of the liquid.

Tests have shown that a very thick layer of dirt on the inner wall of the measurement cell measurement section in the longitudinal direction between the two conductivity measurement cells has a typical electrical resistance in the range of 50 kOhm. The electrical resistance of the fluid within the measurement line is electrically parallel to the dirt layer resistance and is of approximately the same range for water as for the dirt layer, so that this results in a total resistance of approximately 25 kOhm in the absence of an air bubble. If an air bubble exists in the measurement line that almost completely fills the entire free diameter inside the measurement line, an electrical fluidic resistance in the longitudinal direction of the measurement line of more than 1000 kOhm can be expected, so that a total electrical resistance of approximately 50 kOhm results. An air bubble can be detected with very high reliability even with a thick layer of dirt inside the measurement line. A dirt layer-tolerant flow velocity measurement arrangement is thus thereby created with a simple and an inexpensive means.

The electrical conductivity is the reciprocal value of the electrical resistance and is to be understood as a synonym thereof in the technical sense.

Each conductivity measurement cell preferably has both a first electrode and a second electrode, whereby the two electrodes of the measurement cell are arranged at a distance from each other in the direction of flow or in the direction of the flow through a measurement cell measurement section, so that the conductivity of the liquid is determined within the measurement cell measurement section in the direction of flow. The electrical resistance is measured in the longitudinal direction between the two electrodes, i.e., in the fluid flow direction. The distance between the two electrodes should be a multiple of a typical air bubble diameter.

The two electrodes of a conductivity measurement cell are more preferably each designed as annular ring electrode bodies. This provides, among other things, that in the presence of a layer of dirt in the measurement cell, the electrical resistance between the electrode and the fluid inside the is measurement cell is relatively small.

The air bubble injector can in principle act independently, for example, by injecting one or more air bubbles into the fluid flow at constant intervals. In a preferred embodiment of the present invention, the evaluation unit actively controls the air bubble injector. The evaluation unit can thereby, for example, automatically set the measuring prevalence or the measuring frequency. The evaluation unit can furthermore also control the respective amount of air fed in depending on secondary parameters. An adaptive measurement regime can thereby be provided.

The measurement cell measurement section is preferably formed by a stiff and electrically non-conductive measurement cell cable. The length of the measurement cell measurement section can be at least ten times the inner diameter thereof, for example, the measurement cell measurement section can have an inner diameter of about 1.8 mm and a length of about 25 mm. The inner diameter should be chosen so that it is not larger than a typical air bubble diameter in water, i.e., it should be a few millimetres at most.

In a preferred embodiment of the present invention, the evaluation unit comprises a measurement signal generator that produces a measurement voltage whose peak voltage is below the typical electrolysis voltage of water. The electrolysis voltage of water is between 1.0 V and 2.0 V. The peak voltage of the measurement voltage should therefore preferably be below 2.0 V.

The measuring signal generator more preferably generates as a measuring voltage a symmetrical alternating voltage which preferably has a frequency of between 500 Hz and 100 kHz. The first electrode is connected to the measurement signal generator, while the second electrode is connected to a receiver, or vice versa.

The input impedance of the receiver can be matched to the typical conductivity of the water samples by adjusting the AC voltage frequency and a capacitive element at the input of the receiver. If an air bubble is present in the measurement cell measurement section, the impedance between the two electrodes of the measurement cell changes, which change is detected by the electrodes.

The evaluation unit preferably has a pollution detector that determines and outputs a degree of pollution of the measurement cell measurement section from the ratio of the measurement cell measurement signals with and without an air bubble. The degree of contamination information can be used, for example, to trigger cleaning cycles or maintenance instructions.

Figure 2:
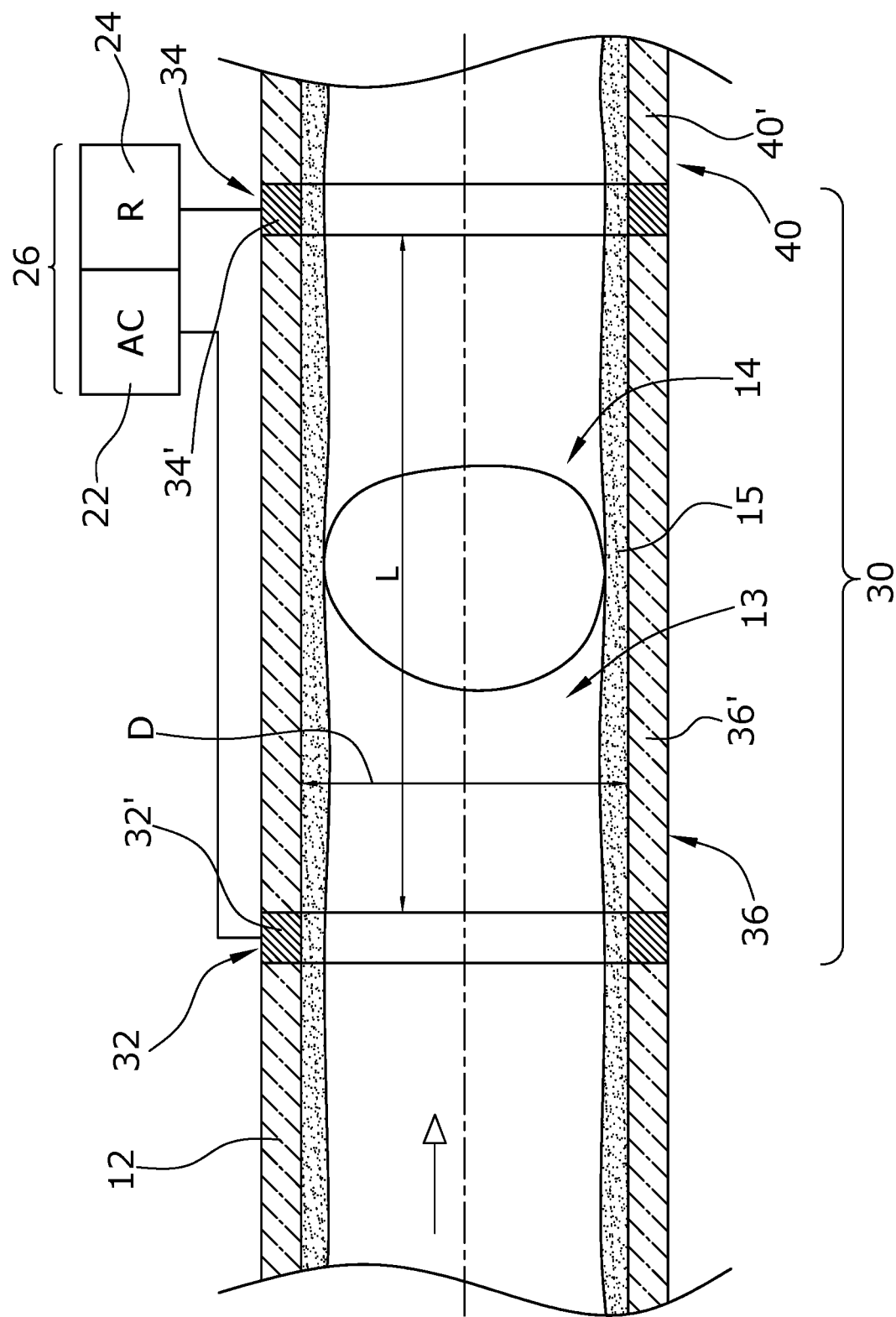

An embodiment example of the present invention is explained in greater detail below under reference to the drawings, which show:

FIG. 1 schematically shows a flow velocity measurement arrangement which includes two conductivity measurement cells, which is used to sample a water sample for a process analyser; and FIG. 2 shows a schematic representation of a conductivity measurement cell of the flow velocity measurement arrangement of FIG. 1.

FIG. 1 schematically shows a flow velocity measurement arrangement 10 which is used, for example, in a waste water treatment plant, for taking samples from a process basin 90 for a land-based process analysis unit 100.

A water sample of wastewater 91 from the process basin 90 is pumped through a submerged sample filter 92 by a sample pump 80 to the process analysis unit 100. The sample pump 80 is provided as a peristaltic pump so that the entire fluidic portion of the sample pump 80 can be easily replaced if necessary. A conductive flow velocity measurement module 10' is fluidically arranged between the sample pump 80 and the process analysis unit 100. The conductive flow velocity measurement module 10' determines the flow velocity of the fluid in a measurement line 40 which is configured to be stiff, to have a constant volume, and to have a defined measurement line length X. The conductive flow velocity measurement module 10' determines the flow velocity of the fluid in the measurement line 40 via injected air bubbles 14 and a transit time measurement.

A three-way valve 82' is arranged fluidically between the sample filter 92 and the sample pump 80, the three-way valve 82' being arranged as an air bubble injector 82 which fluidically connects the valve outlet either to a line coming from the sample filter 92 or to the ambient air. The air bubble injector 82 is controlled by an electronic evaluation unit 20 of the flow rate measurement module 10'.

The water sample flows from the sample pump 80 through a feed line 12 into the flow velocity measurement module 10', which consists essentially of the evaluation unit 20, a first electrical conductivity measurement cell 30, the measurement line 40, and a second electrical conductivity measurement cell 30', which is structurally identical to the first conductivity measurement cell 30. The evaluation unit 20 has a separate measurement electronics module 26, 26' for each respective electrical conductivity measurement cell 30, 30', each of which also has a respective measurement signal generator 22 and a measurement signal receiver 24.

An example of a conductivity measurement cell 30 is shown in FIG. 2. The conductivity measurement cell 30 comprises a first electrode 32 which is arranged upstream of a measurement cell measurement section 36, and a second electrode 34 which is arranged downstream of the measurement cell measurement section 36. The two electrodes 32, 34 are designed as annular ring electrode bodies 32', 34', which consist of electrically conductive stainless steel and which each form a very short section of the flow channel with their cylindrical inner circumferential surfaces, i.e., they are in electrical contact with the liquid sample with their entire inner circumferential surface.

The measurement cell measurement section 36 is defied by an electrically non-conductive and rigid measurement cell line 36' which is made of plastic and which has an inner diameter D of approximately 1.8 mm and a length of approximately 25.0 mm. The rigid measurement line 40 between the two electrically conductivity measurement cells 30, 30' consists of a line body 40', which also has an (identical) inner diameter D of 1.8 mm and a length X of, for example, 250 mm.

In the shown embodiment, a closed layer of dirt 15 has built up on the inside of the entire fluid line shown in FIG. 2, the closed layer of dirt 15 also covering the inner circumferential surfaces of the two electrodes 32, 34 and thus fundamentally complicating the conductivity measurement. The water sample 13 flows in the free lumen of the first electrical conductivity measurement cell 30, which is interrupted by an air bubble 14. The diameter of the air bubble 14 usually corresponds to the inner diameter D or the free lumen of the measurement cell line 36'.

A flow velocity measurement is initiated by the evaluation unit 20 by controlling the air bubbles 14 injected by the three-way valve 82' so that one or more air bubbles are introduced into the water sample flowing by. The sample pump 80 runs continuously at an approximately constant speed.

The measurement signal generator 22 generates as a measuring voltage a symmetrical alternating voltage with an alternating voltage frequency of, for example, 10 kHz and a peak voltage of at most 1.5 V, which is below the specific electrolysis voltage of water. The measurement voltage is inducted into the measurement cell measurement section 36 via the first electrode 32. The second electrode 34 is electrically connected to the measurement signal receiver 24, which has an input impedance that is adapted to the typical conductivity of the water sample by an appropriate adjustment of the AC voltage frequency and a capacitive element at the input of the measurement signal receiver 24. When a measuring air bubble 14 passes through, the measured impedance changes significantly, so that this constitutes the start signal or the end signal for the transit time measurement. The transit time of the measurement air bubble 14 between the two electrically conductivity measurement cells 30, 30' is thus determined from the temporal curve of the conductivity measurement results of the two electrical conductivity measurement cells 30, 30' or from the time interval of the conductivity peaks caused by the air bubbles. During a measuring cycle, the measurement signal generator 22 continuously generates its symmetrical alternating voltage, which is continuously received by the measurement signal receiver 24.

The evaluation unit 20 calculates the flow velocity or volumetric flow rate of the liquid or water sample between the sample filter 92 and the land-based process analysis unit 100 from the length X of the measurement line 40 and the determined transit time.

The evaluation unit 20 has a contamination determiner 27 which determines a degree of contamination of the measurement cell measurement section 36 from the ratio of the determined and stored cell measurement signals with and without an air bubble 14 and outputs this to a device control. The greater the determined measuring signal ratio, the greater the degree of contamination.

LIST OF REFERENCE NUMERALS

10 Flow velocity measurement arrangement
10' Flow velocity measurement module
12 Feed line
13 Water sample
14 Air bubble/Injected air bubbles
15 Layer of dirt
20 Electronic evaluation unit
22 Measurement signal generator
24 Measurement signal receiver
26 Measurement electronics module (for the first electrical conductivity measurement cell)
26' Measurement electronics module (for the second electrical conductivity measurement cell)
27 Contamination determiner
30 First electrical conductivity measurement cell
30' Second electrical conductivity measurement cell
32 First electrode
32' Annular ring electrode body
34' Annular ring electrode body
34 Second electrode
36 Measurement cell measurement section
36' Measurement cell line
40 Rigid measurement line
40' Line body
80 Sample pump
82 Air bubble injector
82' Three-way valve
90 Process basis
91 Wastewater
92 Sample filter
100 Land-based process analysis unit
D Inner diameter
X Measurement line length

The invention claimed is:

1. A flow velocity measurement arrangement for determining a flow velocity of an electrically conductive liquid in a liquid line, the flow velocity measurement arrangement comprising:
   an air bubble injector for injecting an air bubble into a liquid flow;
   a first electrical conductivity measurement cell arranged downstream of the air bubble injector and upstream of a measurement line;
   a second electrical conductivity measurement cell arranged downstream of the measurement line;
   an evaluation unit which is configured to determine the flow velocity of the electrically conductive liquid in the measurement line on the basis of time-related characteristics of conductivity measurement results of the first electrical conductivity measurement cell and the second electrical conductivity measurement cell; and
   a measurement cell measurement section,
   wherein, each of the first electrical conductivity measurement cell and the second electrical conductivity measurement cell comprise a first electrode and a second electrode, and
   the first electrode and the second electrode are, as seen in a flow direction, arranged spaced apart from one another by the measurement cell measurement section so that a conductivity of the liquid within the measurement cell measurement section is determined in the flow direction.

2. The flow velocity measurement arrangement according to claim 1, wherein each of the first electrode and the second electrode are formed as an annular ring electrode body.

3. The flow velocity measurement arrangement according to claim 1, wherein the evaluation unit is further configured to control the air bubble injector.

4. The flow velocity measurement arrangement according to claim 1, wherein the measurement cell measurement section is defined by a measurement cell line comprising a length and an inner diameter, the length being at least ten times the inner diameter.

5. The flow velocity measurement arrangement according to claim 1, wherein the evaluation unit comprises a measuring signal generator which is configured to generate a measuring voltage having a peak voltage which is below an electrolysis voltage of water.

6. The flow velocity measurement arrangement according to claim 5, wherein the measuring signal generator is further configured to generate a symmetrical alternating voltage as the measuring voltage.

7. The flow velocity measurement arrangement according to claim 6, wherein the symmetrical alternating voltage has a frequency of between 500 Hz and 100 kHz.

8. The flow velocity measurement arrangement according to claim 1, wherein the evaluation unit further comprises a contamination determiner which is configured to determine and to output a degree of contamination of the measurement cell measurement section based on a ratio of a measurement signal with an air bubble and a measurement signal without the air bubble in the first electrical conductivity measurement cell and the second electrical conductivity measurement cell.

9. A method for determining a flow velocity of an electrically conductive liquid using flow velocity measurement arrangement in a liquid line, comprising:
   injecting, using an air bubble injector, an air bubble into a liquid flow;

providing a first electrical conductivity measurement cell arranged downstream of the air bubble injector and upstream of a measurement line;

providing a second electrical conductivity measurement cell arranged downstream of the measurement line;

determining, using an evaluation unit the flow velocity of the electrically conductive liquid in the measurement line on the basis of time-related characteristics of conductivity measurement results of the first electrical conductivity measurement cell and the second electrical conductivity measurement cell; and providing a measurement cell measurement section, wherein, each of the first electrical conductivity measurement cell and the second electrical conductivity measurement cell comprise a first electrode and a second electrode, and the first electrode and the second electrode are, as seen in a flow direction, arranged spaced apart from one another by the measurement cell measurement section so that a conductivity of the liquid within the measurement cell measurement section is determined in the flow direction.

10. The method according to claim 9, wherein each of the first electrode and the second electrode are formed as an annular ring electrode body.

11. The method according to claim 9, wherein the evaluation unit is further configured to control the air bubble injector.

12. The method according to claim 9, wherein the measurement cell measurement section is defined by a measurement cell line comprising a length (L) and an inner diameter (D), the length (L) being at least ten times the inner diameter (D).

13. The method according to claim 9, wherein the evaluation unit comprises a measuring signal generator which is configured to generate a measuring voltage having a peak voltage which is below an electrolysis voltage of water.

14. The method according to claim 13, wherein the measuring signal generator is further configured to generate a symmetrical alternating voltage as the measuring voltage.

15. The method according to claim 14, wherein the symmetrical alternating voltage has a frequency of between 500 Hz and 100 kHz.

16. The method according to claim 9, wherein the evaluation unit further comprises a contamination determiner which is configured to determine and to output a degree of contamination of the measurement cell measurement section based on a ratio of a measurement signal with an air bubble and a measurement signal without the air bubble in the first electrical conductivity measurement cell and the second electrical conductivity measurement cell.

17. A product for determining a flow velocity of an electrically conductive liquid using flow velocity measurement arrangement in a liquid line, comprising:

a first electrical conductivity measurement cell arranged downstream of an air bubble injector and upstream of a measurement line;

a second electrical conductivity measurement cell arranged downstream of the measurement line; and a storage device that stores code, the code being executable by a processor and comprising:

code that determines a flow velocity of an electrically conductive liquid using flow velocity measurement arrangement in a liquid line, comprising:

code that injects, using an air bubble injector, an air bubble into a liquid flow;

code that determines, using an evaluation unit the flow velocity of the electrically conductive liquid in the measurement line on the basis of time-related characteristics of conductivity measurement results of the first electrical conductivity measurement cell and the second electrical conductivity measurement cell, wherein, each of the first electrical conductivity measurement cell and the second electrical conductivity measurement cell comprise a first electrode and a second electrode, and the first electrode and the second electrode are, as seen in a flow direction, arranged spaced apart from one another so that a conductivity of the electrically conductive liquid is determined in the flow direction.

\* \* \* \* \*